United States Patent [19]

Leonhardt

[11] Patent Number: 5,696,755
[45] Date of Patent: Dec. 9, 1997

[54] SYSTEM FOR MINIMIZING THE EFFECTS OF SCRATCHES ON RECORDING MEDIA

[75] Inventor: Michael Lawrence Leonhardt, Longmont, Colo.

[73] Assignee: Storage Technology Corporation, Louisville, Colo.

[21] Appl. No.: 971,453

[22] Filed: Nov. 4, 1992

[51] Int. Cl.$^6$ ........................................... G11B 7/00
[52] U.S. Cl. ........................................... 369/275.5
[58] Field of Search ................... 369/44.11, 110, 369/44.13, 95, 112, 275.1–275.5, 44.34, 44.38, 97, 13; 360/77.17, 83, 114, 5, 6

[56] References Cited

U.S. PATENT DOCUMENTS

| | | | |
|---|---|---|---|
| 3,931,460 | 1/1976 | Watson | 369/44.13 |
| 3,962,720 | 6/1976 | Braat | 369/44.13 |
| 4,067,044 | 1/1978 | Maeda et al. | 369/44.13 |
| 4,223,347 | 9/1980 | Bouwhuis et al. | 369/44.13 |
| 4,486,796 | 12/1984 | Sakamoto | 360/77.17 |
| 4,841,501 | 6/1989 | Izoka et al. | 369/110 |
| 4,982,398 | 1/1991 | Yamamoto et al. | 369/44.13 |
| 5,023,856 | 6/1991 | Raaymakers et al. | 369/44.13 |

*Primary Examiner*—Nabil Hindi
*Attorney, Agent, or Firm*—Duft, Graziano & Forest, P.C.

[57] ABSTRACT

A system is disclosed which significantly reduces the susceptibility of a recording media to data loss due to scratches. The system uses a signal generator function to inject a periodic, small amplitude dither signal into the head positioning servo system during a write or preformatting operation to the media. This dither signal is typically sinusoidial and causes the data tracks to effectively wander back and forth over longitudinal scratches on tape media or circular scratches on disk media. The data tracks are thus never coincident with a large portion of the scratch. During read-back of the media, a tracking servo system in the tape or disk drive follows the data written on each dithered track. Since the amplitude, period, and shape of the dither's periodic offset are fixed and known in advance, the servo can effectively track the data on the tape without compromising head positioning performance. Freed from correcting scratch induced errors, the error detection and correction circuitry used with the drive system can be simplified and/or optimized to better handle non-scratch related errors.

32 Claims, 3 Drawing Sheets

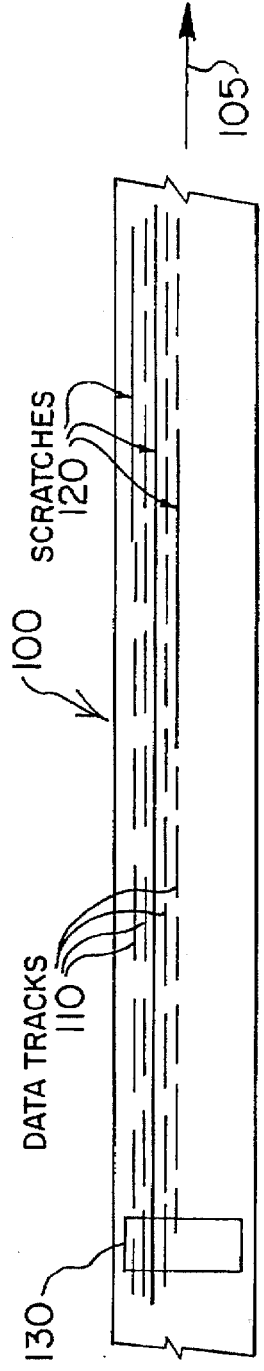
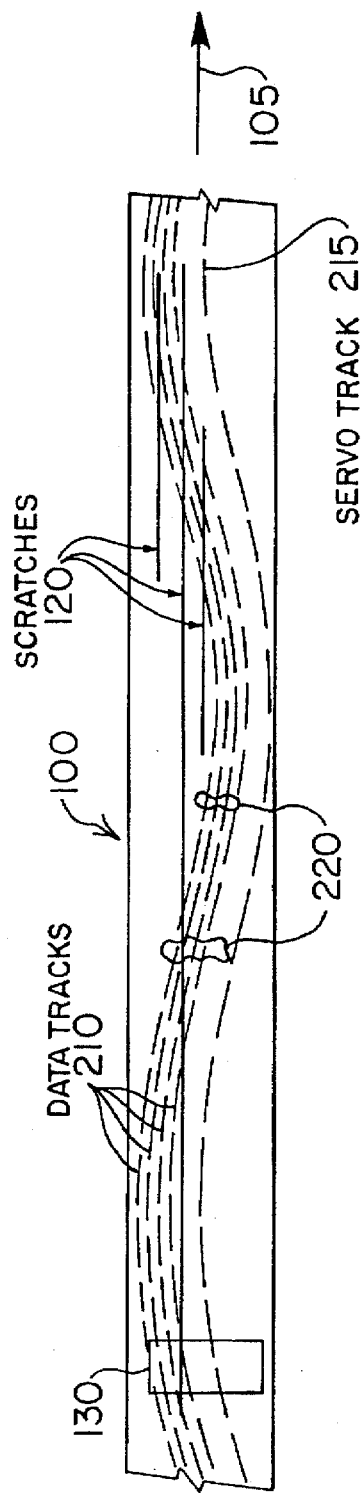
FIG. 1. PRIOR ART
FIG. 2.

SYSTEM FOR MINIMIZING THE EFFECTS OF SCRATCHES ON RECORDING MEDIA

FIELD OF THE INVENTION

This invention relates to data storage systems and, more particularly, to a system for minimizing the effects of longitudinal scratches on tape media and circular scratches on disk media.

PROBLEM

It is a problem in high density tape data storage systems to provide data integrity which is not affected by routine sources of tape damage. Damage is often incurred by a tape when the tape is handled or when the tape is run through a tape drive system. Scratches which run longitudinally along the length of the media are a commonly occurring type of damage to tape media. Recording formats that use narrow longitudinal tracks are susceptible to data losses when scratches coincide with one or more data tracks. In order to store more information on a given media, the number of tracks on a given media are typically increased. The probability that one or more tracks will incur a loss of data due to a longitudinal scratch is thus increased. Error detecting and correcting systems are typically used to handle these defects. However, if a given system is optimized for handling long longitudinal scratches, the system becomes less efficient and less capable of handling other common tape defects such as randomly located small defects which affect a few bits of data on a single track or relatively large localized voids. Voids are often caused by a loss of material or a particle in the media's active coating and can cover portions of several tracks.

Rotating media, such as floppy disks, are also subject to data loss from media scratching. Circular scratches on rotating media are often the result of the circular motion of the media with respect to its housing and the associated read/write mechanisms of the drive.

Optical tape and optical floppy (flexible) disk media are typically even more vulnerable than magnetic media to scratches because the optical track densities are greater. Furthermore, these flexible optical media cannot utilize the thick, rigid cover layers used in rigid optical disks to desensitize the recording process to scratches and debris.

SOLUTION

The present invention overcomes the foregoing problems and achieves an advance in the art by providing a system which significantly reduces the susceptibility of a magnetic or optical tape to data loss due to longitudinal scratches.

The system uses a signal generator to inject a periodic small amplitude dither signal into the head positioning servo system during a write operation to the media. This dither signal is typically sinusoidal and causes the data tracks to effectively "wander" back and forth over longitudinal scratches. The data tracks are thus never coincident with a large portion of the scratch.

During read-back of the tape, a tracking servo system in the tape or disk drive follows the data written on each dithered track. Since the amplitude, period, and shape of the dither's periodic offset are fixed and known in advance, the servo can effectively track the data on the tape without compromising head positioning servo performance. Therefore, the error detection and correction (EDAC) circuitry used with the drive system can be simplified and/or optimized to better handle non-scratch induced errors. The present system makes the EDAC capability more efficient and thus provides for more efficient and reliable magnetic and optical tape systems.

The present system is also applicable to rotating media such as magnetic or optical floppy (flexible) disks and is particularly suited to operate with optical floppy disks, which typically have a higher track density than magnetic floppy disks. When used with rotating media, the system writes non-circular data tracks to the media to avoid coincidence between the data tracks and circular scratches on the media. Pre-formatting may also be employed to place reference features on the media that is used during the data writing process to guide the placement of data tracks to achieve the periodic displacement required to minimize coincidence between data track scratches. The pre-formatting process can use conventional magnetic or optical writing means to write servoable features on the media. Alternately, mechanical deformation of the media through embossing or a related process may be used to create the necessary servo features.

BRIEF DESCRIPTION OF THE DRAWING

FIG. 1 illustrates the prior art wherein the tape media has a plurality of longitudinal scratches which are coincident with certain data tracks on the media;

FIG. 2 illustrates the system of the present invention wherein coincidence between longitudinal scratches and data tracks is minimized;

DETAILED DESCRIPTION OF THE INVENTION

Figure 3:
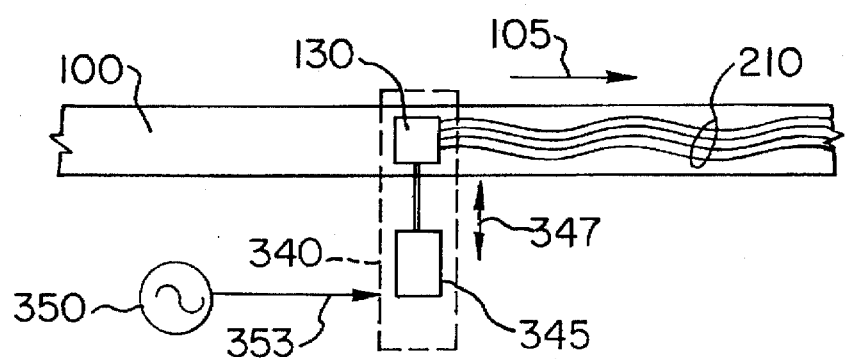
FIG. 3 illustrates an embodiment of the invention using magnetic tape.

FIG. 1 illustrates the prior art wherein the tape media 100 has a plurality of longitudinal scratches 120 which are coincident with certain of the data tracks 110 on the tape media 100. FIG. 2 illustrates the system of the present invention wherein coincidence between longitudinal scratches 120 and data tracks 210 is minimized due to the fact that the data tracks 210 no longer run parallel to the longitudinal axis of the tape media 100. In any tape media 100 which travels longitudinally (in direction 105) across various components in a tape drive transport (not shown), longitudinal scratches 120 often occur on the media 100. These longitudinal scratches 120 typically coincide with only one, or at most, a few of the data tracks 210 on the media 100. Longitudinal scratches 120, however, are usually coincident with a given (prior art) data track 110 for the entire length of the scratch 120.

In addition to longitudinal scratches 120, random localized voids 220 due to embedded foreign material and coating defects also occur on tape media 100. These voids 220 are short with respect to the longitudinal dimension of the media 100, but can transversely interfere with multiple data tracks 110, 210.

Error detection and correction ("EDAC") systems are typically used to compensate for both of the above types of media defects 120, 220. EDAC implementations, however, cannot optimally compensate for both long longitudinal scratches 120 and random localized transverse defects 220. Therefore, the present system minimizes the occurrence of longitudinal scratches 120 coincident with data tracks 210 so that EDAC implementations can be made more efficient to handle small, localized media defects 220.

The present system is most efficiently operated in conjunction with a tape drive or disk drive system which utilizes a closed loop read/write head positioning system, which is well-known in the art.

Tape media 100 or rotating media 600 can also be magnetically or optically pre-formatted by the present system to facilitate the tracking of data written to the media 100/600. Media 100/600 which has been pre-formatted facilitates the use of a tracking servo system to follow a dedicated servo track 215 to position the tape drive or disk drive read/write head 130.

Magnetic Tape Media

FIG. 3 illustrates an exemplary embodiment of the invention using magnetic tape media 100. A signal generator 350 injects a small amplitude dither signal 353 into the head positioning servo system 345 during a write operation to tape media 100. The dither signal 353 is typically sinusoidial with a fixed period and fixed amplitude. Mechanical actuator 345 moves read/write head 130 in accordance with the dither signal's period and amplitude. Each data track 210 written to tape media 100 is displaced accordingly in a transverse (vertical) direction 347 relative to the longitudinal dimension of tape media 100. The data tracks 210 thus "wander" up and down over any longitudinal scratches 120. The periodically displaced data track pattern is shown more clearly in FIG. 2, where the amplitude of the displacement in vertical direction 347 has been exaggerated. Data tracks 210 are thus never coincident with a large portion of a longitudinal scratch 120.

The dither signal 353 injected into the head positioning servo system 340 need not necessarily be sinusoidial. Any dither signal 353 is effective which is either substantially sinusoidial or which produces a data track format in which the distance between an edge of said tape media 100 and a given point on any one of the longitudinal tracks 210 varies as a function of the longitudinal displacement of the given point from a pre-defined reference line transverse to the length of the tape media 100. Periodic signals such as sawtooth or triangle waveforms can also be used as dither signals 353 to provide the benefits of the present invention.

Specific embodiments of this invention are application dependent. The nature of the media damage (i.e., scratching) must be quantified as to width, length, frequency of occurrence, etc. Choice of recording formats (and EDAC system) along with recording channel performance determines the acceptable limits of coincidence between data tracks 210 and the media damage. Significant parameters that should be considered include data density, track density, media velocity, data block structure, and EDAC system code run lengths. Additional parameters include the available characteristics of the head actuator 345 and head servo system 340.

In an exemplary embodiment for a ½ magnetic tape system with 20 um (micrometer) track width, typical longitudinal scratches 120 are 10 um wide. The dither signal period is chosen so that a data track 110 coincides with a scratch 120 no more than once per data record. A data record length was chosen which occupies about one inch of tape media 100. With a tape media velocity of 2 meters/second, the data record is handled in about 13 milliseconds. In the present example, dither signal 353 is chosen to have an equal period of 13 milliseconds, or a frequency of $\frac{1}{13}$ milliseconds, which equals 787 Hz. Four track widths provide sufficient transverse displacement from the scratch. Therefore, the dither amplitude is:

±4×20 um=±80 um peak to peak displacement.

To read back data written on magnetic tape media 100, a standard tape drive track following servo would typically follow ("track") the dithered tracks 210 as written, because the nominal dither displacement amplitude, as calculated above, is small. However, if a large displacement dither signal 353 is chosen, it may be necessary to supplement a typical tape drive's servo system 340 by injecting a tracking dither signal 353 that matches the period, amplitude and phase of the original recording dither signal 353 to reduce the servo system's error amplitudes to manageable levels. It is envisioned that the dither signal characteristics be standardized in a family of products such that the track displacement characteristics recorded onto the media 100 are predictable. However, due to tape drive and media tolerances, it is also possible that each tape drive include a system to precisely synchronize and lock these standardized dither signals 353 to the particular track characteristics of the media 100 being used.

Optical Tape Media

Figure 4:
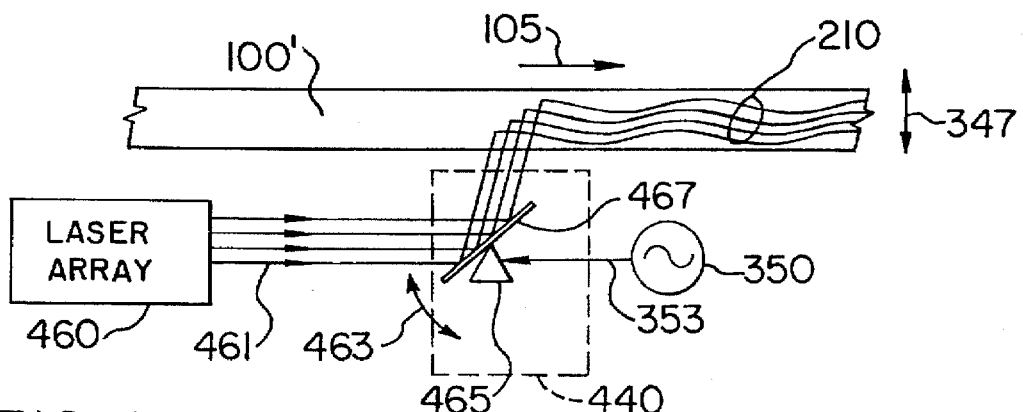
FIG. 4 illustrates an embodiment of the invention using optical tape.

FIG. 4 illustrates an exemplary embodiment of the invention wherein optical tape media 100' is used. Laser array 460 emits light beams 461 which are deflected by mirror 467 onto optical tape media 100'. Signal generator 350 injects dither signal 353 into the galvanometer's beam positioning servo system 440 during a write operation to tape media 100'. Galvanometer 465 moves in direction 463 in accordance with the amplitude of dither signal 353 to deflect light beams 461 from laser array 460 onto tape media 100'. Data tracks 210 on tape media 100' are displaced accordingly in a vertical direction 347 transverse to the longitudinal dimension of tape media 100'. As in the case of magnetic tape media 100, data tracks 210 are non-coincident with a large portion of any longitudinal scratches 120.

When data written on optical tape media 100' is read back, the tape drive's standard track following servo would typically follow the dithered tracks as written as nominal dither displacement amplitudes are small. However, if a large transverse displacement dither is chosen, it may be necessary to supplement the typical drive's servo system 440 by injecting a signal 353 that matches the period, amplitude and phase of the dither signal 353 used when the data tracks were originally written, in order to reduce the servo system's error amplitudes to manageable levels. In the situation wherein the data tracks 210 have a large transverse displacement, signal generator 350 applies a tracking signal 353 to servo system 440. Mirror 467 is thus displaced with the amplitude necessary to track and read the data tracks 210 written on tape media 100'.

Read/write operations on optical tape media 100' are even more critical than those involving magnetic tape media 100 when media damage is considered. This is because the number of tracks per given media width is typically greater on optical tape media 100' than on magnetic media 100. The effects of media defects are thus more pronounced and EDAC system implementations become more important. The present system makes the EDAC capability more efficient and thus provides for more efficient and reliable optical tape systems.

Appending of Data Segments on Non-Preformatted Media

When tape media 100 is not preformatted, provisions must be made for maintaining synchronization between the servo track 215 and read/write head 130 when newly written data is appended to existing data written on the tape media 100. Appending of data is not a problem unless the tape media 100 is stopped between write operations. After tape media 100 is stopped, a synchronization discontinuity will generally occur when the tape media 100 is re-started to perform a data append operation. This is because the phase of the dither signal 353 applied during the append operation will be random with respect to the phase of the dither signal 353 previously stored on the tape media 100. A method is thus required to re-establish synchronization with the dithered servo track 130.

One such method is to create a non-data gap between the end of a given write operation and the beginning of the next write (i.e., append) operation. This gap should be of sufficient length to allow the servo tracking system 340 to re-synchronize with the dithered servo track 215.

Figure 7:
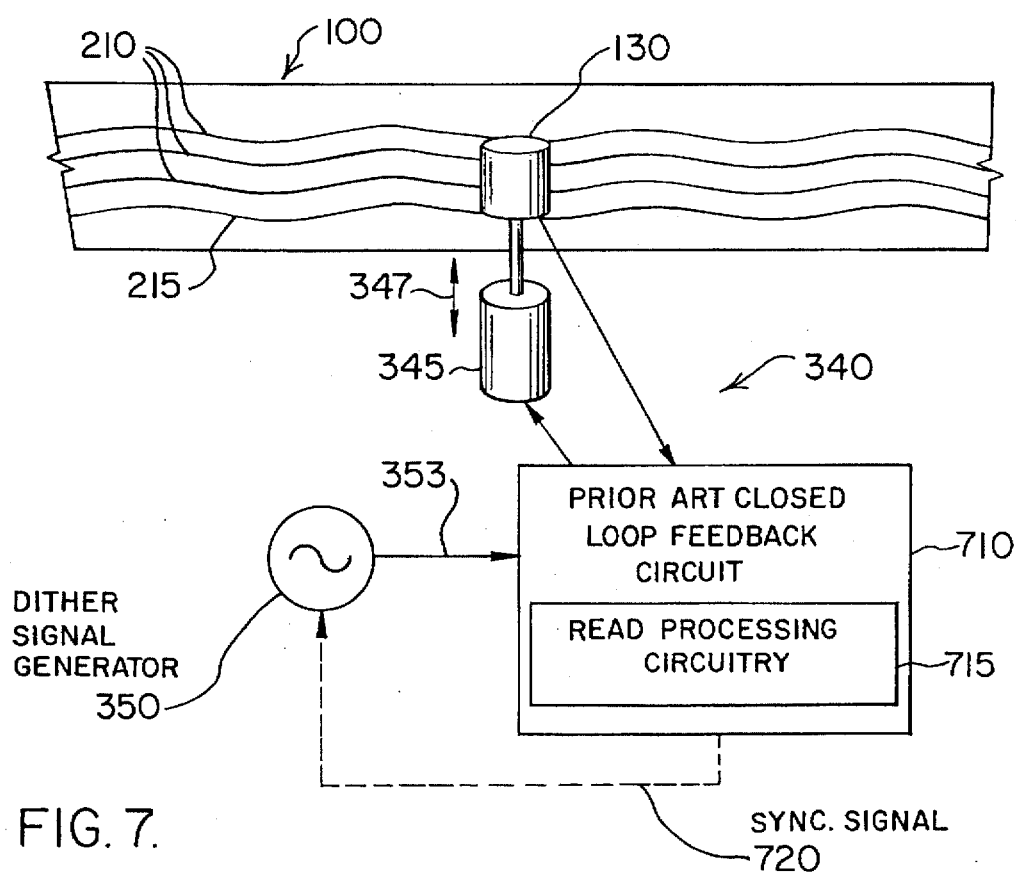
FIG. 7 illustrates the interface between a prior art closed loop feedback circuit and the present system.

It is also possible to avoid synchronization discontinuities between successive appended data segments by utilization of a second method. FIG. 7 illustrates the interface between a prior art closed loop feedback circuit 710 and the present system. This method employs a synchronization signal 720 from the feedback loop read processing circuitry 715 to allow dither signal generator 350 to synchronize with data on data tracks 210 already written to tape media 100. When an append operation is to be performed after tape media 100 is stopped, the tape media 100 is first moved backwards (rewound) a sufficient distance to allow the servo tracking system 340 to re-synchronize with the dithered servo track 215 when the tape drive is re-started. When the tape drive is then started to perform the data append operation, dither signal generator 350 adjusts the phase of dither signal 353 so as to be in synchronization with synchronization signal 720. By the time tape media 100 reaches the end of the previously written data, dither signal 353 is in phase with previously written dithered servo track 215 and the appended data is written to uninterrupted "seamless" data tracks 210. These seamless tracks 210 avoid the wasting of tape space resulting from writing gaps using the first method explained above.

Media Pre-formatting

Where media is preformatted, there is no need for re-synchronization of the servo tracking system between successive write operations. Dither signal 353 can also be injected into servo system 340 to pre-format tape media 100 or rotating media 600.

One embodiment of the invention employs the use of pre-formatting to place reference features on the tape media 100 that are used during the data writing process to guide the placement of data tracks 210 to achieve the periodic displacement required to minimize coincidence between data tracks 210 and scratches 120.

The pre-formatting process can use conventional magnetic or optical writing means to write servo features, such as a servo track 215, on the media 100. Alternately, mechanical deformation of the media through embossing or a related process may be used to create the necessary servo features.

Embossed Pre-formatted Media

Figure 5:
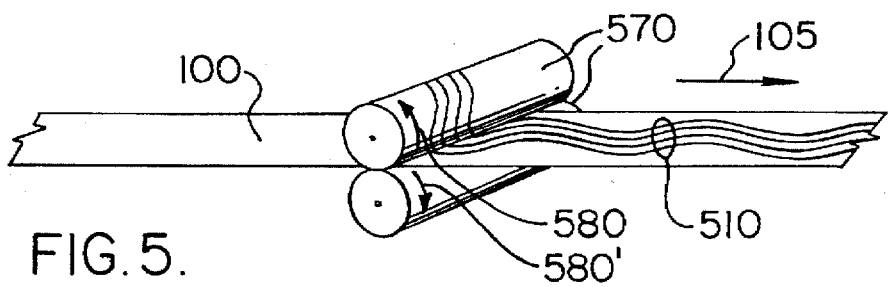
FIG. 5 illustrates an embodiment of the invention wherein physical embossing is used to pre-format a tape.

FIG. 5 illustrates an exemplary embodiment of the invention wherein physical embossing is used to pre-format a tape media 100. Prior to a read or write operation, tape media 100 is pre-formatted by passing tape media 100 through rollers 570 which rotate in directions 580, 580' to physically emboss optically readable features 510 on tape media 100 in a sinusoidial pattern. A similar system can be applied to floppy disks while at the web level of processing. Such pre-formatting can also be performed by conventional magnetic or optical apparatus as illustrated in FIGS. 3 and 4.

Rotating Media

Figure 6:
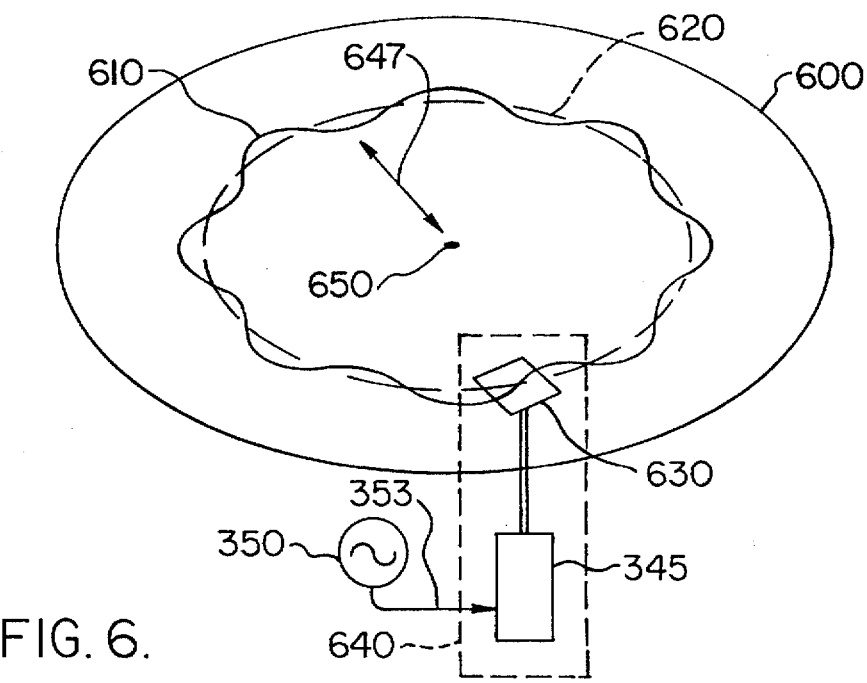
FIG. 6 illustrates an embodiment of the invention applicable to rotating media.

FIG. 6 illustrates an embodiment of the invention used with rotating media 600. The system of the present invention is applicable to any rotating media 600 such as magnetic or optical floppy (flexible) disks. The present system is particularly suited to operate with optical floppy disks, which have a relatively high track density. For purposes of clarity in FIG. 6, only a single data track 610 and a single circular scratch 620 on rotating media 600 are shown.

In a process analogous to that described above for tape media 100, signal generator 350 injects dither signal 353 into head positioning servo system 640 during a write operation to rotating media 600. Servo system 640 causes mechanical actuator 345 to move read/write head 630 in accordance with the dither signal amplitude. Each data track 610 written to rotating media 600 is displaced accordingly in a direction 647 radially relative to the center 650 of the rotating media 600. The data tracks 610 thus "wander" inward and outward over any circular scratches 620 or segments thereof.

In order to read back data written on rotating media 600, the disk drive's standard track following servo system 640 would typically follow the dithered tracks 610 as written, as nominal dither displacement amplitudes are small. However, if a large transverse displacement dither is chosen, it may be necessary to supplement the typical disk drive's servo system 640 by injecting a signal 353 that matches the period, amplitude and phase of the original dithered signal 353 to reduce the servo system's error amplitudes to manageable levels. Rotating media 600 may also be preformatted by physically embossing the media 600.

It is to be expressly understood that the claimed invention is not to be limited to the description of the preferred embodiment but encompasses other modifications and alterations within the scope and spirit of the inventive concept.

I claim:

1. A method for minimizing the effect of longitudinal scratches on tape media during the writing of data to said tape media and the reading of data from said tape media, wherein said data is written on said tape media in longitudinal tracks, said method comprising the steps of:
    (a) writing said data to said tape media in a format in which the distance between an edge of said tape media and a given point on any one of said longitudinal tracks varies as a function of the longitudinal displacement of said given point from a pre-defined reference location transverse to the length of said tape media; and
    (b) tracking said format to read said data from said tape media.

2. The method of claim 1 wherein said function is periodic with respect to the longitudinal dimension of said tape media.

3. A method for minimizing the effects of longitudinal scratches on tape media during the writing of data to said tape media and the reading of data from said tape media, said method comprising the step of:
    writing said data to said tape media on a plurality of parallel tracks placed longitudinally on said tape media in a substantially sinusoidal curve having an amplitude sufficient to minimize coincidence between said tracks and said scratches on said tape media, wherein the time axis of said substantially sinusoidal curve is parallel to the longitudinal dimension of said tape media.

4. A method for reducing errors in reading data stored on tape media having longitudinal scratches, wherein said data is written on said media in longitudinal tracks, said method comprising the steps of:
 (a) writing said data to said tape media so that said longitudinal tracks form a time-periodic curve having an amplitude sufficient to minimize coincidence between said tracks and said scratches on said tape media, wherein the time axis of said time periodic curve is parallel to the longitudinal dimension of said tape media; and
 (b) tracking said time periodic curve to read said data from said tape media.

5. The method of claim 4, wherein said tape media is magnetic tape media and said steps of writing and tracking use a combination of magnetic and optical means.

6. The method of claim 4, wherein said tape media is optical tape media and said steps of writing and tracking use a combination of magnetic and optical means.

7. The method of claim 4, wherein said tape media is preformatted by writing a servo track to said tape media so that said servo track forms a time-periodic curve wherein the time axis of said time periodic curve is parallel to the longitudinal dimension of said tape media.

8. The method of claim 4, wherein said tape media is preformatted by embossing a servo track on said tape media so that said servo track forms a sinusoidal curve wherein the time axis of said sinusoidal curve is parallel to the longitudinal dimension of said tape media.

9. A method for minimizing the effects of scratches on rotating media during the writing of data to said rotating media and the reading of data from said rotating media, wherein said scratches are located on circles concentric with the rotational center of said media, said method comprising the step of:
 writing said data to said rotating media in a plurality of concentric tracks having a format sufficiently non-circular to minimize coincidence between the data tracks and said scratches on the rotating media.

10. The method of claim 9, including the additional step of tracking said non-circular format to read said data from said rotating media.

11. The method of claim 9, wherein a curve traced along the circumference of each of said concentric tracks is disposed as a time-periodic function with respect to the center of said rotating media.

12. The method of claim 9, wherein said rotating media is preformatted by writing a servo track to said rotating media so that said servo track has a non-circular format.

13. The method of claim 10, wherein said rotating media is magnetic disk media and said steps of writing and tracking use a combination of magnetic and optical means.

14. The method of claim 10, wherein said rotating media is optical disk media and said steps of writing and tracking use a combination of magnetic and optical means.

15. A method for minimizing the effects of circular scratches on rotating media during the writing of data to said rotating media and the reading of data from said rotating media, said method comprising the step of:
 writing said data to said rotating media in a plurality of concentric circular tracks each of which has a center non-coincident with the center of rotation of said rotating media.

16. Apparatus for reducing errors in reading data stored on tape media having longitudinal scratches, wherein said data is written on said media in longitudinal tracks, said apparatus comprising:
 (a) means for writing said data to said tape media so that said longitudinal tracks form a time periodic curve having an amplitude sufficient to minimize coincidence between said tracks and said scratches on said tape media, wherein the time axis of said time periodic curve is parallel to the longitudinal dimension of said tape media; and
 (b) means for tracking said time periodic curve to read said data from said tape media.

17. The apparatus of claim 16, including means for appending successive segments of data so that said tracking means can be synchronized with said time periodic curve.

18. Apparatus for minimizing the effects of longitudinal scratches on tape media during the writing of data to said tape media and the reading of data from said tape media, wherein said data is written on said tape media in longitudinal tracks, said apparatus comprising:
 (a) head positioning means for writing said data to said tape media and reading said data from said tape media;
 (b) control means for controlling said head positioning means to write said data to said tape media and to read said data from said tape media; and
 (c) wherein said data is written in a format in which the distance between an edge of said tape media and a given point on any of said longitudinal tracks varies as a function of the longitudinal displacement of said given point from a pre-defined reference location transverse to the length of said tape media.

19. The apparatus of claim 18 wherein said function is timewise substantially sinusoidal with respect to the longitudinal dimension of said tape media.

20. The apparatus of claim 18 wherein said control means includes a signal generator to generate a sinusoidal signal to effect said format of said data.

21. The apparatus of claim 18, including means for appending successive segments of data to synchronize said head positioning means with said time periodic curve.

22. Apparatus for minimizing the effects of longitudinal scratches on tape media during the writing of data to said tape media and the reading of data from said tape media, said apparatus comprising:
 (a) head positioning means for positioning a read/write head to:
  (i) write a servo track having a substantially sinusoidal curve having an amplitude sufficient to minimize coincidence between said tracks and said scratches on said tape media, wherein the time axis of said substantially sinusoidal curve is parallel to the longitudinal dimension of said tape media and
  (ii) write said data to said tape media on a plurality of tracks placed longitudinally on said tape media parallel to said servo track; and
 (b) control means for tracking said servo track to position said read/write head to read said data from said tape media.

23. The apparatus of claim 22, further including a signal generator for applying a sinusoidal signal to said head positioning means to effect said sinusoidal curve.

24. The apparatus of claim 23 wherein said signal generator applies said sinusoidal signal to said control means to cause said read/write head to follow said servo track.

25. Apparatus for minimizing the effects of circular scratches on rotating media during the writing of data to said rotating media and the reading of data from said rotating media, said apparatus comprising:

(a) means for writing said data to said rotating media in a plurality of concentric tracks having a format sufficiently non-circular to minimize coincidence between the data tracks and said scratches on the rotating media; and (b) means for tracking said data written to said rotating media to read said data on said rotating media.

26. The apparatus of claim 25, wherein a curve traced along the circumference of each of said concentric tracks is sinusoidally disposed with respect to the center of said rotating media.

27. Apparatus for minimizing the effects of longitudinal scratches on tape media during the writing of data to said tape media and the reading of data from said tape media by a read/write head, wherein said data is written on said tape media in longitudinal tracks, said apparatus including a head positioning servo system for positioning said read/write head to write said data on said tape media and to read said data from said tape media, said apparatus comprising:

(a) a signal generator for applying:
  (i) a first signal to said head positioning servo system for positioning said read/write head to write said data to said tape media;
  (ii) a second signal to said head positioning servo system to cause said read/write head to track said data written to said tape media; and (b) wherein said data is written to said tape media in a format in which the distance between an edge of said tape media and a given point on any of said longitudinal tracks varies as a function of the longitudinal displacement of said given point from a pre-defined reference location transverse to the length of tape media.

28. The apparatus of claim 27 wherein said function is timewise substantially sinusoidal with respect to the longitudinal dimension of said tape media.

29. The apparatus of claim 27 wherein said first signal and second signal are both timewise periodic signals, and wherein:

(a) said second signal has a period equal to that of said first signal; and (b) said second signal is of an magnitude necessary to cause said actuator to be displaced with an amplitude necessary to track said data written to said tape media.

30. Apparatus for minimizing the effects of longitudinal scratches on an optical tape during the writing of data to said optical tape and the reading of data from said optical tape, wherein said data is written on said optical tape in longitudinal tracks, said apparatus comprising:

(a) an optical head for positioning said light source to write said data on said optical tape and to control the position of said light source to read said data written to said optical tape;

(b) a signal generator for applying a signal to said optical head for positioning said light source to write said data to said optical tape and to read said data written to said optical tape; and (c) wherein said data is written to said optical tape in a format in which the distance between an edge of said optical tape and a given point on any of said longitudinal tracks varies as a function of the longitudinal displacement of said given point from a pre-defined reference location transverse to the length of said optical tape.

31. The apparatus of claim 30 wherein said function is timewise substantially sinusoidal with respect to the longitudinal dimension of said optical tape.

32. Apparatus for minimizing the effects of longitudinal scratches on tape media during the writing of data to said tape media and the reading of data from said tape media by a read/write head, and wherein said data is written on said tape media in longitudinal tracks, said apparatus comprising:

(a) embossing means for applying said longitudinal tracks on said tape media;

(b) tracking means for tracking said longitudinal tracks which have been embossed;

(c) wherein said read/write head is positioned by said tracking means to write said data to said tape media and to read said data written to said tape media; and (d) wherein said longitudinal tracks are embossed on said tape media in a format in which the distance between an edge of said tape media and a given point on any of said longitudinal tracks varies as a substantially sinusoidial function of the longitudinal displacement of said given point from a pre-defined reference location transverse to the length of said tape media.

* * * * *